United States Patent Office 3,823,140
Patented July 9, 1974

3,823,140
Δ³-4-CARBOXY-3-OXOBUTYL CEPHALOSPORINS
John Colin Clark, Gerrards Cross, and William George Elphinstone Underwood, Stoke Poges, England, assignors to Glaxo Laboratories Limited, Greenford, England
No Drawing. Filed Mar. 23, 1971, Ser. No. 127,404
Claims priority, application Great Britain, July 3, 1970, 32,476/70; Mar. 5, 1971, 14,981/71, 19,631/71
Int. Cl. C07d 99/24
U.S. Cl. 260—243 C   5 Claims

ABSTRACT OF THE DISCLOSURE

The invention is concerned with Δ³-4-carboxy cephalosporin antibiotics possessing a 3-oxobutyl group at the 3-position. The invention also describes processes for the preparation of such compounds.

---

This invention is concerned with improvements in or relating to antibiotics. In particular, the invention is concerned with a novel group of Δ³-4-carboxy cephalosporin antibiotics.

The cephalosporin compounds referred to in this specification are generally named with reference to cepham (see *J. Amer. Chem. Soc.*, 1961, 84, 3400). The term "cephem" refers to the basic cepham structure with a single double bond. Where a dotted line bridges the 2-, 3- and 4-positions this indicates that the compound may be a ceph-2-em or ceph-3-em compound.

As is well known in the art, Δ³-4-carboxy cephalosporin antibiotics are compounds which are generally depicted by the formula

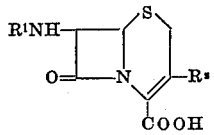

wherein $R^1$ is a carboxylic acyl group and $R^2$ is the 3-substituent.

The novel compounds of the invention are characterized by possessing inter alia a 3-oxobutyl substituent.

According to one embodiment of the invention we provide compounds of the general formula

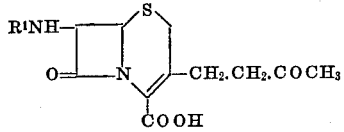

(wherein $R^1$ is a carboxylic acyl group) and physiologically acceptable salts and esters thereof e.g. base salts (where applicable) and acid addition salts (where applicable) and compounds obtained by reacting an amino group and/or acylamido group(s) of the 7-side chain with a ketone, e.g. acetone or methyl ethyl ketone, or an aldehyde.

By the term "physiologically acceptable" as applied to compounds of the invention we mean those derivatives which are physiologically acceptable in the dosage at which they are administered. Such derivatives include salts and esters.

Since optically-active centres may be present in the substituents at the 7-position the invention includes within its scope the various diastereoisomers as well as mixtures thereof.

Compounds of formula (I) according to the invention possess anti-bacterial activity against a range of gram positive and gram negative organisms and are of value in human and veterinary medicine. They may also be of value in the preparation of other 3-substituted cephalosporin compounds.

The group $R^1$ in the above formula may represent a wide variety of acyl groups which may contain 1-20 carbon atoms. Specific acyl groups are illustrated in the accompanying list which is not intended to be exhaustive:

(i) $R^uC_nH_{2n}CO$— where $R^u$ is aryl (carboxylic or heterocyclic), cycloalkyl, substituted aryl, substituted cycloalkyl, cyclohexadienyl, or a non-aromatic heterocyclic or mesoionic group, and $n$ is an integer from 1-4. Examples of this group include phenylacetyl; substituted phenylacetyl e.g. fluorophenylacetyl, nitrophenylacetyl, aminophenylacetyl, acetoxyphenylacetyl, methoxyphenylacetyl, methylphenylacetyl, or hydroxyphenylacetyl; N,N-bis (2-chloroethyl) aminophenylpropionyl; thien-2- and 3-ylacetyl; 4-isoxazolyl and substituted 4-isoxazolylacetyl; pyridylacetyl; tetrazolylacetyl or a sydnoneacetyl group. The substituted 4-isoxazolyl group may be a 3-aryl-5-methyl isoxazol-4-yl group, the aryl group being e.g. phenyl or halophenyl e.g. chloro- or bromo-phenyl. An acyl group of this type is 3-o-chlorophenyl-5-methylisoxazol-4-yl-acetyl.

(ii) $C_nH_{2n+1}CO$— where $n$ is an integer from 1-7. The alkyl group may be straight or branched and, if desired, may be interrupted by an oxygen or sulphur atom or substituted by e.g. a cyano group, a carboxy group, an alkoxycarbonyl group, a hydroxy group or a carboxycarbonyl group (—CO.COOH). Examples of such groups include cyanoacetyl, hexanoyl, heptanoyl, octanoyl and butylthioacetyl.

(iii) $C_nH_{2n-1}CO$— where $n$ is an integer from 2-7. The alkenyl group may be straight or branched and, if desired, may be interrupted by an oxygen or a sulphur atom. An example of such a group is allylthioacetyl.

(iv)

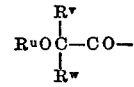

where $R^u$ has the meaning defined under (i) and in addition may be benzyl, and $R^v$ and $R^w$ which may be the same or different each represent hydrogen, phenyl, benzyl, phenethyl or lower alkyl. Examples of such groups include phenoxyacetyl, 2-phenoxy-2-phenylacetyl, benzyloxyacetyl, 2-phenoxypropionyl, 2-phenoxybutyryl, methylthiophenoxyacetyl.

(v)

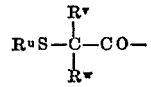

where $R^u$ has the meaning defined under (i) and, in addition, may be benzyl and $R^v$ and $R^w$ have the meanings defined under (iv). Examples of such groups include S-phenylthioacetyl, S-chlorophenylthioacetyl, S-fluorophenylthioacetyl, pyridylthioacetyl, and S-benzylthioacetyl.

(vi) $R^uZ(CH_2)_mCO$— where $R^u$ has the meaning defined under (i) and, in addition, may be benzyl, Z is an oxygen or sulphur atom and $m$ is an integer from 2-5. An example of such a group is S-benzylthiopropionyl.

(vii) $R^uCO$— where $R^u$ has the meaning defined under (i). Examples of such groups include benzoyl, substituted benzoyl (e.g. aminobenzoyl), 4-isoxazolyl- and substituted 4-isoxazolylcarbonyl, cyclopentanecarbonyl, sydnonecarbonyl, naphthoyl and substituted naphthoyl (e.g. 2-ethoxynaphthoyl), quinoxalinylcarbonyl and substituted quinoxalinylcarbonyl (e.g. 3-carboxy-2-quinoxalinylcarbonyl). Other possible substituents for benzoyl include alkyl, alkoxy, phenyl, phenyl substituted by carboxy, alkylamido, cycloalkylamido, allylamido, phenyl(lower) alkylamido, morpholinocarbonyl, pyrrolidinocarbonyl, piperidiocarbonyl, tetra-hydropyridino, furfurylamido, or N-alkyl-N-anilino, or derivatives thereof and such substituents may be in the 2- or 2- and 6-positions. Examples of such substituted benzoyl groups are 2,6-dimethoxybenzoyl, 2-methylamidobenzoyl and 2-carboxybenzoyl. Where the group $R^u$ represents a substituted 4-isoxazolyl group, the substituents may be as set out above under (i). Examples of such 4-isoxazolyl groups are 3-phenyl-5-isoxazol - 4 - yl carbonyl and 3-o-(2,6-dichlorophenyl)-5-methyl-isoxazol-4-yl carbonyl.

(viii)

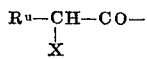

where $R^u$ has the meaning defined under (i) and X is amino, substituted amino (e.g. acylamido or a group obtained by reacting the α-amino-acylamido group of the 7-side chain with an aldehyde or ketone e.g. acetone, methylethylketone or ethyl acetoacetate), hydroxy, carboxy, esterified carboxy, azido, triazolyl, tetrazolyl, cyano, halogeno, acyloxy (e.g. formyloxy or lower alkanoyloxy) or etherified hydroxy group. Examples of such acyl groups are α-amino-phenylacetyl and α-carboxyphenylacetyl.

(ix)

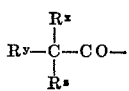

where $R^x$, $R^y$ and $R^z$ which may be the same or different may each represent lower alkyl, phenyl or substituted phenyl or $R^x$ represents hydrogen. An example of such an acyl group is triphenylmethylcarbonyl (x) $R^u$—NH—CO— where $R^u$ has the meaning defined under (i) and in addition may be hydrogen, lower alkyl or halogen substituted lower alkyl. An example of such a group is $Cl(CH_2)_2NHCO$.

(xi)

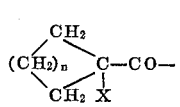

where X has the meaning defined under (viii) above and n is an integer of from 1 to 4. An example of such an acyl group is 1-aminocyclohexanecarbonyl.

(xii) Amino acyl, for example

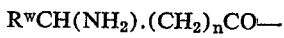

where n is an integer from 1–10, or

where m is zero or an integer from 1–10, and n is 0, 1 or 2, $R^w$ is a hydrogen atom or an alkyl, aralkyl or carboxy group or a group as defined under $R^u$ above, and Ar is an arylene group, e.g. p-phenylene or 1,4-naphthylene. Examples of such groups are disclosed in British Patent Specification No. 1,054,806. A group of this type is the p-aminophenylacetyl group. Other acyl groups of this type include those, e.g. 5-aminoadipoyl, derived from naturally occurring amino acids, and derivatives thereof e.g. N-benzoyl-5-aminoadipoyl.

(xiii) Substituted glyoxylyl groups of the formula $R^y.CO.CO$— where $R^y$ is an aliphatic, araliphatic or aromatic group, e.g. a thienyl group, a phenyl group, or a mono-, di- or tri-substitued phenyl group, the substituents being, for example, one or more halogen atoms (F, Cl, Br, or I), methoxy groups, metyl groups or amino groups, or a fused benzene ring. Included in this group are also the α-carbonyl derivatives of the above substituted glyoxylyl groups.

(xiv) Formyl.

Where compounds of formula I are primarily intended for use as intermediates, important species of the group $R^1$ are:

(xv) Hydrocarbyloxycarbonyl and substituted hydrocarbyloxy groups (wherein the 7-amino group forms part of a urethane), e.g. lower alkoxycarbonyl groups (such as methoxycarbonyl, ethoxycarbonyl and t-butoxycarbonyl groups); halo lower alkoxycarbonyl groups e.g. 2, 2,2 - trichloroethoxycarbonyl; aralkoxycarbonyl groups such as benzyloxycarbonyl, 4-methoxybenzyloxycarbonyl, diphenylmethoxycarbonyl and 4-nitrobenzyloxycarbonyl groups; and cycloalkoxycarbonyl groups e.g. adamantyloxycarbonyl.

(xvi) Haloformyl e.g. chloroformyl.

An important group of compounds according to the invention are the compounds of the general formula

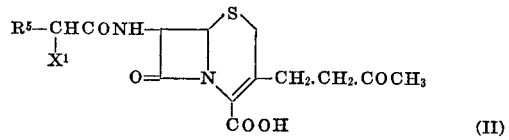

(II)

where $R^5$ is an aromatic group, e.g. phenyl or phenyl substituted with halo, hydroxy, lower alkyl, nitro, amino, lower alkanoyl, lower alkoxy or lower alkylmercapto; naphthyl; or a heterocyclic group, (particularly a 5- or 6-membered heterocyclic group containing at least one hetero atom selected from S, N and O, e.g. thien-2-yl or thien-3-yl); and $X^1$ is amino; substituted amino e.g. acylamido; hydroxy; formyloxy; lower alkanoyloxy or hydrogen and physiologically acceptable derivatives thereof.

The compounds of general formula II wherein the corresponding acid $R^5CH(X^1)COOH$ (where $R^5$ is phenyl or substituted phenyl and $X^1$ is amino or hydroxy) is of the D-series are of particular interest.

An example of a compound of formula II is 7β-(2-amino-2-phenylacetamido) - 3 - (3-oxobutyl) ceph-3-em-4-carboxylic acid of the formula

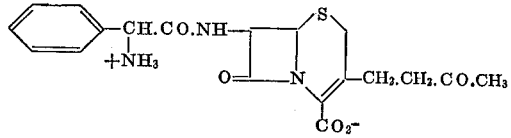

III

7β-(D - 2 - Amino-2-phenylacetamido)-3-(3-oxobutyl) ceph-3-em-4-carboxylic acid is a broad-spectrum antibiotic being active against gram-positive and gram-negative organisms as evidenced by in vitro tests, displaying activity against Staphylococcus aureus, E. coli, Proteus mirabilis, Klebsiella aerogenes, Hafnia, Aerobacter cloacae and S. typhimurium.

A further example of a compound of formula II is 3-(3-oxobutyl) - 7β - (2-thienylacetamido)-ceph-3-em-4-carboxylic acid

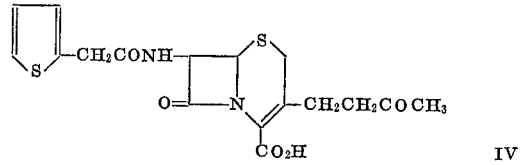

IV and physiologically acceptable derivatives thereof. This compound is a broad spectrum antibiotic being active against a range of gram-positive and gram-negative organisms as evidenced by in vitro tests.

An important series of compounds related to those of formula III are those having, at the 37-position the group

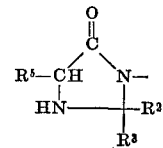

wherein $R^5$ has the above defined meaning and $R^2$ and $R^3$, which may be the same or different, are lower alkyl groups ($C_{1-4}$), particularly methyl or ethyl, or isomeric forms of said groups, and base salts thereof.

Salts which may be formed from the compounds according to the invention include (a) inorganic base salts such as alkali metal, e.g. sodium and potassium, alkaline earth e.g. calcium, and organic base salts e.g. procaine and dibenzylethylene diamine salts and (b) acid addition salts e.g. with hydrochloric, hydrobromic, sulphuric, nitric, phosphoric, toluene-p-sulphonic and methanesulphonic acids. The salts may also be in the form of resinates, formed e.g. with a polystyrene resin containing amino, quaternary amino, or sulphonic acid groups, or a resin containing carboxyl groups e.g. a polyacrylic acid resin. The resin may if desired be cross-linked, e.g. it may be a copolymer of styrene and divinylbenzene containing the appropriate groups.

In copending Application Ser. No. 127,403 filed on even date herewith one of use, viz W. G. E. Underwood, has claimed $\Delta^3$-4-carboxy cephalosporin antibiotics having at position 3 a substituent of the formula:

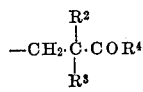

(wherein $R^2$ is selected from hydrogen; lower alkyl; phenyl; phenyl substituted by one or more of halogen, lower alkyl, lower alkoxy, nitro, amino or lower alkylamino; lower alkoxycarbonyl; mono- or di-aryl lower alkoxycarbonyl; lower alkylcarbonyl; aryl lower alkyl or $C_5$ or $C_6$ cycloalkyl; $R^3$ is selected from lower alkyl; phenyl; phenyl substituted by one or more halogen, lower alkyl, lower alkoxy, nitro, amino or lower alkylamino; lower alkoxycarbonyl; mono- or di-aryl lower alkoxycarbonyl; lower alkylcarbonyl; aryl lower alkyl or $C_5$ or $C_6$ cycloalkyl; and $R^4$ is selected from hydrogen; lower alkyl; phenyl; phenyl substituted by one or more of halogen, lower alkyl, lower alkoxy, nitro, amino or lower alkylamino; aryl lower alkyl or $C_5$ or $C_6$ cycloalkyl) and physiologically acceptable salts and esters thereof.

One suitable process for the preparation of a compound of the formula

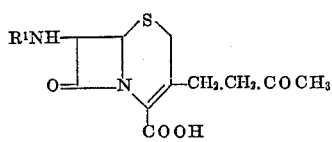

(wherein $R^1$ is a carboxylic acyl group) and physiologically acceptable salts and esters thereof, comprises reacting a compound of the formula

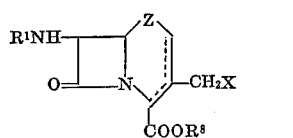

(wherein $R^1$ has the above-defined meaning, $R^8$ is hydrogen or a carboxyl-blocking group, Z is $>S$ or $>S \to O$ ($\alpha$- or $\beta$-) and X is chlorine, bromine or iodine) with an anion which may be represented by a carbanion of the formula

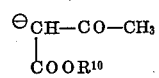

(wherein $R^{10}$ is hydrogen or an alcohol or phenol residue) and decarboxylating, preceded if necessary by hydrolysis, the resulting compound of formula

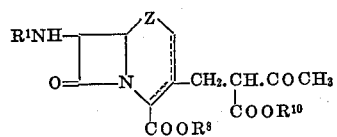

(VII)

(wherein $R^1$, $R^8$, $R^{10}$ and Z have the above-defined meanings) whereafter, if necessary, any of the following reactions are carried out; (i) conversion of a $\Delta^2$ isomer into the desired $\Delta^3$ isomer, (ii) removal of any groups protecting any amino or carboxyl groups and (iii) reduction of a compound in which Z is $>S \to O$ to form the desired $Z = >S$ compound.

For the sake of simplicity the group

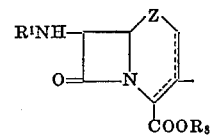

is represented below by Q—.

REACTION WITH CARBANION

The required carbanions may be obtained from the conjugate acid of the formula

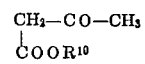

(IX)

by treatment with a base. The carbanion may be generated in situ in the process according to the invention by reaction of the conjugate acid with a base, preferably stronger than the carbanion. Suitable bases include alkali metal and alkaline earth metal hydroxides, carbonates and hydrogen carbonates e.g. sodium hydroxide or sodium hydrogen carbonate. Other bases which may be used to generate the carbanions include the conjugate bases of dimethylsulphoxide, dimethylacetamide, dimethylformamide and hexamethylphosphoramide; tertiary nitrogen bases e.g. pyridine or trialkylamines such as triethylamine; the sodio or lithio derivatives of hexamethyldisilazane; alkali metal hydrides, e.g. sodium hydride; alkali metal alkoxides; e.g. sodium t-butoxide; sodium triphenylmethide; alkylene oxides (e.g. ethylene oxide or propylene oxide) which may be potentiated with halide ion; fluoride ion in an aprotic solvent. Enolic derivatives containing thallium (I) may also be used and we regard these as sources of the desired carbanions or equivalent nucleophiles.

While the carbanion may be generated with one equivalent of base it is preferable to employ about two equivalents when $R^8=H$, since, unless the group at the 4-position of the cephalosporin starting material is present as $—CO_2^-$, one equivalent of base will be required to generate the species $—CO_2^-$ and a second equivalent will be required to generate the carbanion. It is not desirable to use more than about three equivalents of base when $R^8=H$ since there will then be available anions that may complete with the carbanion in the process according to the invention.

The reaction may be carried out by stirring the components together, e.g. at a temperature of from $-80°$ to $+80°$ C., preferably from $-10°$ to $+35°$ C. When the reaction is effected at a temperature at which one or more reactants may volatilise a closed system may be used. The reaction may be effected in an inert or relatively inert solvent, for example, a halogenated hydrocarbon, e.g. methylene chloride; a hydrocarbon e.g. benzene or n-hexane; an acyclic or cyclic ether e.g. diethyl ether, tetrahydrofuran or dioxan; dimethylsulphoxide; an amide e.g. dimethylformamide or dimethylacetamide or hexamethylphosphoramide. The course of the reaction may be followed by thin-layer or paper chromatography and by ultra-violet spectroscopy (in general, the $\lambda_{max}$ shifts to higher wave-lengths, as the reaction produces chromophoric groups).

Decarboxylation

The carbanion reaction thus produces a compound of formula

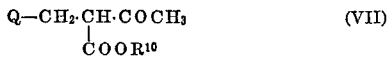
(VII)

(where $R^{10}$ has the above-defined meaning) and such compounds may be de-esterified e.g. by hydrolysis to form a compound possessing a 2-carboxy-3-oxobutyl group. Hydrolysis may be effected under mild conditions by treatment with a base or acid. The course of the hydrolysis may be followed by paper chromatography.

Compounds of the general formula $$Q-CH_2-CH_2-COCH_3 \qquad (I)$$

may then be prepared by decarboxylating the compound possessing the 2-carboxy-3-oxobutyl substituent.

The decarboxylation is ordinarily effected at a temperature of e.g. −40° to +100° C. and may be effected concomitantly with cleavage e.g. hydrolysis in the same reaction medium preferably at a temperature of 0° to 80° C. The course of the decarboxylation may be followed by thin layer chromatography, paper chromatography, nuclear magnetic resonance spectroscopy and estimation of the evolved $CO_2$.

[Compounds of formula (VII) wherein $R^{10}$=H may be prepared from the corresponding esters or nitriles i.e. compounds of the general formula

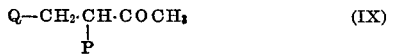
(IX)

where P is CN or $COOR^{10}$ where $R^{10}$ is an ester residue.]

Cephalosporin reactants may be employed as free 4—COOH compounds or in forms having a blocking group at the 4-position e.g. an ester with an alcohol or phenol which may readily be split off, e.g. by hydrolysis or reduction, at a later stage of the reaction, or as an acid addition salt, e.g. with nitric acid or a hydrocarbyl sulphonic acid, of the free 4—COOH compound or ester thereof. Examples of hydrocarbyl sulphonic acids include alkylbenzene sulphonic acids, e.g. p-toluene sulphonic acid, and lower alkane sulphonic acids, e.g. methane sulphonic acid.

The group protecting the 4-carboxyl group may be formed with an alcohol (aliphatic or araliphatic), phenol, silanol, stannanol or acid which may readily be split off at a later stage of the reaction.

Suitable esters thus include compounds containing as 4-ester group, a group selected from the following list which is not intended to be an exhaustive list of possible ester groups (i) —$COOCR^aR^bR^c$ wherein at least one of $R^a$, $R^b$ and $R^c$ is an electron-donor e.g. p-methoxyphenyl, 2,4,6-trimethylphenyl, 9-anthryl, methoxy, acetoxy, tetrahydrofur-2-yl, tetrahydropyran-2-yl or fur-2-yl. The remaining $R^a$, $R^b$ and $R^c$ groups may be hydrogen or organic substituting groups. Suitable ester groups of this type include p-methoxybenzyloxycarbonyl and 2,4,6-trimethylbenzyloxycarbonyl.

(ii) —$COOCR^aR^bR^c$ wherein at least one of $R^a$, $R^b$ and $R^c$ is an electron-attracting group e.g. benzoyl, p-nitrophenyl, 4-pyridyl, trichloromethyl, tribromomethyl, iodomethyl, cyanomethyl, ethoxycarbonylmethyl, arylsulphonylmethyl, 2-dimethylsulphoniumethyl, o-nitrophenyl or cyano. The remaining $R^a$, $R^b$ and $R^c$ groups may be hydrogen or organic substituting groups. Suitable esters of this type include benzoylmethoxycarbonyl, p-nitrobenzyloxycarbonyl, 4-pyridylmethoxycarbonyl, 2,2,2-trichloroethoxycarbonyl and 2,2,2-tribromoethoxycarbonyl.

(iii) —$COOCR^aR^bR^c$ wherein at least two of $R^a$, $R^b$ and $R^c$ are hydrocarbon such as alkyl e.g. methyl or ethyl, or aryl e.g. phenyl and the remaining $R^a$, $R^b$ and $R^c$ group, if there is one, is hydrogen. Suitable esters of this type include, t-butyloxycarbonyl, t-amyloxycarbonyl, diphenylmethoxycarbonyl and triphenylmethoxycarbonyl.

(iv) —$COOR^d$ wherein $R^d$ is adamantl, 2-benzyloxyphenyl, 4-methylthiophenyl or tetrahydropyran-2-yl.

Silyl esters may conveniently be prepared from a halosilane or a silazane of the formula $R^4_3SiX$; $R^4_2SiX_2$;

$R^4_3Si.NH.SiR^4_3$; $R^4_3Si.NH.COR^4$; $R^4_3Si.NH.CO.NH.SiR^4_3$; $R^4NH.CO.NR^4.SiR^4_3$; or $RC^4C(OSiR^4_3):NSiR^4_3$ where X is a halogen and the various groups $R^4$, which can be the same or different, represent hydrogen atoms or alkyl, e.g. methyl, ethyl, n-propyl, iso-propyl; aryl, e.g. phenyl; or aralkyl e.g. benzyl groups.

Preferred derivatives of silanols are silyl chlorides such as for example trimethylchlorosilane and dimethyldichlorosilane.

The carboxyl groups may be regenerated from an ester by any of the usual methods; for example, acid- and base-catalysed hydroylsis (especially for silyl and stannyl esters) is generally applicable, as well as enzymically-catalysed hydrolyses; however, aqueous mixtures may be poor solvents for these compounds and they may cause isomerizations, rearrangements, side-reactions, and general destruction, so that special methods may be desirable. Five suitable methods of desterification are:

(i) Reactions with Lewis acids: Suitable Lewis acids for reaction with the esters include trifluoroacetic acid, formic acid, hydrochloric acid in acetic acid, zinc bromide in benzene and aqueous solutions or suspensions of mercuric compounds. The reaction with the Lewis acid may be improved by addition of a nucleophile such as anisole.

(ii) Reduction: Suitable systems for effecting reduction are zinc/acetic acid, zinc/formic acid, zinc/lower alcohol, zinc/pyridine, palladised-charcoal and hydrogen, electrolysis, and sodium and liquid ammonia.

(iii) Attack by nucleophiles: Suitable nucleophiles are those containing a nucleophilic oxygen or sulphur atom for example alcohols, mercaptans, thiocyanates and water.

(iv) Oxidative methods: for example, which involve the use of hydrogen peroxide and acetic acid.

(v) Irradiation.

N-Deacylation

The carboxylation reaction product may be N-deacylated to yield the corresponding 7β-amino compound.

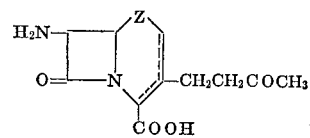
(X)

or a derivative (e.g. ester, salt or salt of ester) thereof and the 7β-amino compound subsequently acylated with an acylating agent corresponding to the acid

(wherein $R^1$ has the above-defined meaning). Acid addition salts e.g. with nitric acid or a hydrocarbyl sulphonic acid, may be formed with the free 4—COOH compound or ester thereof. Examples of hydrocarbyl sulphonic acids include alkylbenzene sulphonic acids, e.g. p-toluene sulphonic acid, and lower alkane sulphonic acids, e.g. methane sulphonic acid.

Suitable methods of N-deacylating cephalosporin derivatives having 7β-acylamido groups are described in British Patent Nos. 1,041,985 and 1,119,806; Belgium Patent No. 719,712 and in South Africa Patent Specification Nos. 68/5,048 and 68/5,327. Another method of N-deacylation which may be used is acid catalysis. For example, N-deformylation of a 7β-formamido group may be effected with a mineral acid at a temperature of minus 15° to +100° C., preferably +15 to 40° C. N-Deformylation may be effected with the aid of a Lewis acid in a lower alkanol, preferably under substantially anhydrous conditions.

Acylation

Acylation may be effected with any convenient acylation agent such as for example, an acid halide (e.g. chloride or bromide), an anhydride or mixed anhydride, e.g. with pivalic acid or formed with a haloformate, e.g. a lower alkylhaloformate, or an active ester or azide; alternatively, the acid itself can be used, together with an esterifying agent, e.g. carbonyldiimidazole or a carbodiimide such as N,N'-diethyl-, dipropyl-, or diisopropyl-carbodiimide, or preferably N,N'-dicyclohexylcarbodiimide.

The acylation may be carried out in an aqueous medium, with an acid halide, for example in an aqueous solution of a water-miscible ketone such as acetone, or in an aqueous solution of tetrahydrofuran, preferably also in the presence of an acid binding agent. Suitable acid binding agents include tertiary amines such as triethylamine, dimethylformamide, dimethylaniline; inorganic bases such as calcium carbonate or sodium bicarbonate; and oxiranes which bind hydrogen halide liberated in the acylation reaction. The oxirane is preferably a lower-1,2-alkylene oxide e.g. ethylene oxide or propylene oxide.

The pH in the acylation is preferably maintained at from 5 to 7 during the reaction which may be carried out at temperatures of from −30° to +80° C., preferably from 0 to 25° C. The acylation may also be carried out in an organic solvent medium such as ethyl acetate by, for example, refluxing.

Alternatively the acylation may be effected with an acid halide or mixed anhydride under substantially anhydrous conditions in the liquid phase in an inert Lewis base (preferably one having a tertiary nitrogen atom) having a dielectric constant above 15 and preferably above 30 and containing a hydrogen halide acceptor. The reaction may be carried out on the free 4—COOH compound, on an ester thereof or on an acid addition salt e.g. the hydrogen p-toluene-sulphonate of the 4—COOH compound or ester thereof. One may employ an acid addition salt of said ester under the aforesaid anhydrous conditions since this derivative can be obtained in high yield from the N-deacylation step (see below). Thereafter, if desired, the ester group is removed. The acid halide is advantageously the chloride or bromide.

A further alternative technique for effecting acylation is to employ, as acylating agent, an α-aminoarylacetyl chloride having the free amino group protected as an acid addition salt preferable the hydrochloride.

Methods of effecting acylation under substantially anhydrous conditions are described more fully in British Patent Specification No. 1,104,937.

Generally speaking, methods of acylation which are known in peptide chemistry may be employed. For example, the 7-amino compound (VIII) may be converted, e.g. in situ, to the analogous 7-isocyanate compound prior to acylation with the acid R¹OH.

Subsequent reactions

Where the resultant compound contains a sulphinyl group at the 1-position this may be reduced by any convenient means. This may, for example, be effected by reduction of the corresponding acyloxysulphonium or alkyloxysulphonium salt prepared in situ by reaction with e.g. acetyl chloride in the case of an acetoxysulphonium salt, reduction being effected by, for example, sodium dithionite or by iodide ion as in a solution of potassium iodide in a water miscible solvent e.g. acetic acid, tetrahydrofuran, dioxan, dimethylformamide or dimethylacetamide. The reaction may be effected at a temperature of −20° to +50° C.

Alternatively, reduction of the 1-sulphinyl group may be effected by phosphorus trichloride or tribromide in solvents such as methylene chloride, dimethylformamide or tetrahydrofuran, preferably at a temperature of −20° C. to +50° C.

Where the resultant compound is a ceph-2-em compound, the desired ceph-3-em compound may be obtained by treatment of the former with a base e.g. a base of the type used in the generation of carbanions.

Protection of amino groups

When the 7β-acylamido group contains an amino group it will be necessary to protect this during the various reaction stages. The protecting group is conveniently one which can be removed by hydrolysis without affecting the rest of the molecule, especially the lactam and 7β-amido linkages. The amine protecting group and the esterifying group at the 4—COOH position can be removed using the same reagent. An advantageous procedure is to remove both groups at the last stage in the sequence. Protected amine groups include urethane, arylmethyl (e.g. trityl) amino, arylmethyleneamino, sulphenylamino or enamine types. Such groups can in general be removed by one or more reagents selected from dilute mineral acids e.g. dilute hydrochloric acid, concentrated organic acids, e.g. concentrated acetic acid, trifluoroacetic acid, and liquid hydrogen bromide at very low temperature, e.g. −80° C. A convenient protecting group is the t-butoxycarbonyl group, which is readily removed by hydrolysis with dilute mineral acid, e.g. dilute hydrochloric acid, or preferably with a strong acid (e.g. formic acid, trifluoroacetic acid or liquid HF) e.g. at a temperature of 0–40° C., preferably at room temperature (15–25° C.). Another convenient protecting group is the 2,2,2-trichloroethoxycarbonyl group which may be split off by an agent such as zinc/acetic acid, zinc/formic acid, zinc/lower alcohols or zinc/pyridine. The NH₂ group may also be protected as NH₃⁺ by using the amino acid halide as its hydrohalide under conditions in which the amino group remains protonated.

Typical protecting groups and their methods of removal are illustrated in the following table:

| Type | Example | Usual name and analogues etc. | Usual method of removal |
|---|---|---|---|
| Urethane | 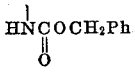 | Benzyloxycarbonyl, p-methoxy | HBr/AcOH (Neat), CF₃COOH (Neat, liq. HBr at −80° C. |
| Do | 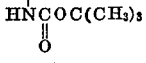 | t-Butoxycarbonyl | Dil. acid (HCl), CF₃COOH (Neat). |
| Do | 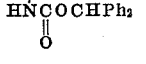 | Diphenylmethoxycarbonyl | CF₃COOH (Neat), dil. HCl etc. |
| Do | 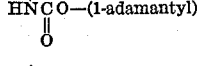 | 1-adamantyloxycarbonyl | Dil. HCl. |
| Arylmethyl |  | Trityl | AcOH plus H₂O, dil. HCl. |

TABLE—Continued

| Type | Example | Usual name and analogues etc. | Usual method of removal |
|---|---|---|---|
| Sulphenyl | HN—S—C₆H₄—NO₂ (o-nitrophenyl) | o-Nitrophenylsulphenyl, p-nitro- | Dil. HCl, NaI or $Na_2S_2O_3$.·pH 2–4. |
| Enamine | H-N(—)C(—CH₃)=C(H)—O—C(R)= (β-dicarbonyl enamine) | β-Dicarbonyl—R=OEt Ethyl acetoacetate; R=CH₃ Acetylacetone; R=Ph Benzoylacetone; R=OMe Methyl acetoacetate; R=C₂H₅ Propionylacetone and many other β-diketones. | Acid labile in varying degree dil. AcOH or HCl etc. |
| Arylmethylene | N=CH—C₆H₄—OH (salicylaldimine) | Anil (similar to β-dicarbonyl) from salicylaldehyde, 5-chlorosalicylaldehyde, 3,5-dichlorosalicylaldehyde, 2-hydroxy-1-naphthaldehyde, 3-hydroxy-pyridine-4-aldehyde. | Dil. HCl, formic acid. |
| Onium | $NH_3^+$ | | Base. |
| Urethane | HN-CO-O-CH₂CCl₃ | β,β,β-Trichloroethoxycarbonyl | Reducing agents e.g. Zn/acetic acid. |

Administration

The compounds according to the invention may be formulated for administration in any convenient way, by analogy with other antibiotics and the invention therefore includes within its scope a pharmaceutical composition comprising a compound of formula I or a non-toxic derivative e.g. salt thereof (as herein defined) adapted for use in human or veterinary medicine. Such compositions may be presented for use in conventional manner with the aid of any necessary pharmaceutical carriers or excipients.

The invention therefore provides pharmaceutical compositions comprising a compound of formula I or a non-toxic derivative thereof (as herein defined) in association with a pharmaceutical carrier or excipient. The compositions may be presented in a form suitable for absorption by the gastro-intestinal tract. Tablets and capsules for oral administration may be in unit dose presentation form, and may contain conventional excipients such as binding agents, for example, syrup, acacia, gelatin, sorbitol, tragacanth, or polyvinyl-pyrrolidone; fillers for example lactose, sugar, maize-starch, calcium phosphate, sorbitol or glycine; lubricants, for example, magnesium stearate, talc, polyethylene glycol, silica; disintegrants, for example, potato starch or acceptable wetting agents such as sodium lauryl sulphate. The tablets may be coated according to methods well known in the art. Oral liquid preparations may be in the form of aqueous or oily suspensions, solutions, emulsions, syrups, elixirs, etc. or may be presented as a dry product, for reconstitution with water or other suitable vehicle before use. Such liquid preparations may contain conventional additives such as suspending agents, for example, sorbitol syrup, methyl cellulose, glucose/sugar syrup, gelatin, hydroxyethylcellulose, carboxymethyl cellulose, aluminium stearate gel or hydrogenated edible fats; emulsifying agents, for example, lecithin, sorbitan mono-oleate or acacia; non-aqueous vehicles which may include edible oils, for example, almond oil, fractionated coconut oil, oily esters, propylene glycol, or ethyl alcohol; preservatives, for example, methyl or propyl p-hydroxybenzoates or sorbic acid. Suppositories will contain conventional suppository bases, e.g. cocoa butter or other glyceride.

Compositions for injection may be presented in unit dose form in ampoules, or in multidose containers with an added preservative. The compositions may take such forms as suspensions, solutions, emulsions in oily or aqueous vehicles, and may contain formulatory agents such as suspending, stabilising and/or dispersing agents. Alternatively the active ingredient may be in powder form for reconstitution with a suitable vehicle, e.g. sterile, pyrogen-free water, before use.

The compositions may also be prepared in suitable forms for absorption through the mucous membranes of the nose and throat or bronchial tissues and may conveniently take the form of powder or liquid sprays or inhalants, lozenges, throat paints etc. For medication of the eyes or ears, the preparations may be presented as individual capsules, in liquid or semi-solid form, or may be used as drops etc. Topical applications may be formulated in hydrophobic or hydrophilic bases as ointments, creams, lotions, paints, powders etc.

For veterinary medicine the composition, may, for example, be formulated as an intramammary preparation in either long acting or quick-release bases.

The compositions may contain from 0.1% upwards, preferably from 10–60% of the active material, depending on the method of administration. Where the compositions comprise dosage units, each unit will preferably contain 50–500 mg. of the active ingredient. The dosage as employed for adult human treatment will preferably range from 100–3000 mg. for instance 1500 mg. per day, depending on the route and frequency of administration.

The compounds according to the invention may be administered in combination with other therapeutic agents such as antibiotics, for example other cephalosporins, the penicillins or tetracyclines.

In order that the invention may be well understood the following Examples are given by way of illustration only.

In the Examples, unless otherwise stated (1) Ultra-violet (UV) spectra were measured on solutions in ethanol.

(2) Infra-red (IR) spectra were measured on mulls in Nujol.

(3) Optical rotations were determined at 19 to 30° at concentrations in the range 0.5 to 1.5% as solutions in dimethylsulphoxide. Where other solvents were used the same concentration range applied.

(4) Solutions were dried over anhydrous magnesium sulphate.

(5) All grades of Kieselgel were supplied by Merck AG, Darmstadt, Germany.

(6) Proton magnesic resonance (PMR) spectra were determined at 60 or 100 MHz. The signs of the coupling constants (J) are not assigned. Signals are assigned as singlets (s) doublets (d), double doublets (dd), triplets (t), quartets (q), double quartets (dq), AB-quartets (AB-q), quintets (qu) and multiplets (m).

*System A* is descending n-propanol:water=7:3, on Whatman No. 1 Paper at room temperature.

*System B* is n-butanol:ethanol:water=4:1:5, equilibrated at room temperature, the upper phase being used as developer in decending manner, in equilibrium with lower phase, on Whatman 1 or 3MM paper buffered to pH 6 with 0.05M sodium dihydrogen phosphate.

*System C* is ethyl acetate:n-butanol:0.1M-sodium acetate, pH=8:1:8, equilibrated at 38° C., the upper phase being used as developer in descending manner, in equilibrium with lower phase at 38°, on No. 1 Whatman paper buffered to pH 5 with 0.1M sodium acetate.

Light petroleum was the fraction, b.p. 40 to 60°. Methylene chloride was dried on Woelm Grade I basic alumina. Thin-layer chromatography was carried out upwards on Merck silica plates developed with benzene:ethyl acetate=4:1, or in these conditions.

*System D* Merck $GF_{254+366}$ plates, with the upper phase of solvent Mixture B for development.

*System E* On the plates of System D, with benzene:ethyl acetate=5:1 for development.

*System F* As System E, but with benzene:ethyl acetate=1:1 as solvent.

These abbreviations are used for the appearances of the spots: s, strong; m, medium; f, faint; v, very.

NMR spectra were measured at 60 and 100 MHz. Signs of the coupling constants cannot be attributed.

As far as possible, analytical values for solvates were confirmed by inspection for the appropriate features in the spectra.

$R_T$ represents the $R_F$ value divided by that of 3-acetoxymethyl-7β-(2-thienylacetamido)ceph-3-em-4-carboxylic acid.

The conditions for electrophoresis are those described by Cocker et al., *J. Chem. Soc.* 1965, 5015.

Organic solutions were dried over desiccated magnesium sulphate.

EXAMPLE 1

(a) 3-(2ξ-Ethoxycarbonyl-3-oxobutyl)-7β-(2-thienylacetamido)ceph-3-em-4-carboxylic acid A solution of ethyl acetoacetate (17.5 g., 135 mmole, 5 equiv.) in freshly dried peroxide-free tetrahydrofuran (50 ml.) was added dropwise with stirring, at below 35°, to a suspension of sodium hydride (3.81 g. of a 45% dispersion in mineral oil, 71.5 mmole, 2.7 equiv.) in tetrahydrofuran (10 ml.). After 30 minutes the addition was over, and the solution was stirred for a further 15 minutes, was then added dropwise with stirring during 25 minutes, at elss than 17°, to a solution of 3-chloromethyl-7β-(2-thienylacetamido)ceph-3-em-4-carboxylic acid (9.8 g., 26.3 mmole) in freshly dried tetrahydrofuran (150 ml.). The pale orange-red solution was stirred at 17° for a further 30 minutes, then was added to N-hydrochloric acid (100 ml.). The tetrahydrofuran was evaporated, the pH taken to 8.0 and the solution was washed with ethyl acetate. The aqueous layer was acidified to pH 2.0 and was extracted into ethyl acetate which was washed, dried partially evaporated and added to a large volume of petroleum spirit (b.p. 60–80°) to give nearly white curds (8.6 g. 70%), m.p. 59 to 80° (decomp.), $[\alpha]_D$ +36° ($CHCl_3$), $\lambda_{max}$ 238 nm. ($\epsilon$ 12,000 inflection at 260 nm. ($\epsilon$ 6,600); a sample purified via its sodium salt had m.p. 115–125° (decomp.). $\lambda_{max}$ (0.1 M-phosphate, pH 6) 236 nm. ($\epsilon$ 13,800), inflection at 260 nm., ($\epsilon$ 8,350), $\nu_{max}$. ($CHBr_3$), 3400 (NH), 1775 (β-lactam), 1730 to 1700 ($CH_2R$, $CO_2H$, and COMe), 1680 and 1510 cm.$^{-1}$ (COHN), τ (60 MHz.; and 100 MHz.; $D_2O$—$NaHCO_3$) 2.65 to 3.03 (approx. 3-proton m; 2-thienyl), 4.47 (1-proton d, J 5 Hz.; $C_7$—H), 5.0 (1-proton d, J 5 Hz.; $C_6$—H), 5.85 (2-proton m; $OCH_2$—Me), 6.12 (2-proton s;

6.49, 6.45 and 6.85 (2-protons, 2-superimposed AB-q, J 17 Hz.; $C_2$—$CH_2$) 6.72, 6.78 and 7.39 (two superimposed AB-q, J 14 Hz.; $C_3$—$CH_2$), 7.71 and 7.74 (3-protons, two s; COMe), 8.76 (3-protons; 2 t, J 7 Hz., separated by ca. 0.5 Hz.; O—$CH_2$—$CH_3$), (Found: C, 51.7; H, 5.0; N, 5.6; S, 13.2 and 13.1. $C_{20}H_{22}N_2O_7S_2$ (466.53) requires C, 51.5; H, 4.9; N, 6.0; S, 13.75%), $R_f$ 0.6 (system C, 0.2 mg., loading), 0.6 (system B, 0.2 mg. loading), 0.45 (system D, 0.1 mg. loading). The compound gave a red-brown colour with 1% methanolic ferric chloride.

(b) Diphenylmethyl 3-(3-oxobutyl)-7β-(2-thienylacetamido)ceph-3-em-4-carboxylate 3-(2ξ-Ethoxycarbonyl-3-oxobutyl)-7β-(2 - thienylacetamido)ceph-3-em-4-carboxylic acid (6.3 g.) was dissolved in water (100 ml.) containing potassium carbonate (6.5 g.) and kept at 50° for 5 hours, by which time paper chromatography showed almost complete consumption of starting material (system C, product, $R_f$ 0.25, starting material, $R_f$ 0.6). The red solution was washed with ethyl acetate, acidified to pH 1.5, and extracted with ethyl acetate, which was washed with water and dried and evaporated to give a foam (4.0 g.). A solution of the foam in freshly dried tetrahydrofuran (40 ml.) was esterified with diphenyl diazomethane (3 g.) in petroleum spirit (b.p. 60–80°, 30 ml.) during 16 hours at 22 to 25°. The solvents were then evaporated and the purple oil was dissolved in ethyl acetate and added to an excess of petroleum spirit to give a pale tan powder (4.98 g.). This was chromatographed on a column of Kieselgel (0.05 to 0.2 mm.) to give the *title compound* (1.8 g., 24% yield from the product of Example 1(a).

A sample was crystallised from ethyl acetate as prisms, m.p. 157 to 159° (decomp.), $[\alpha]_D$+4.3° tetrahydrofuran), $\lambda_{max}$ 235 nm. ($\epsilon$ 13,300), and inflection at 260 nm. ($\epsilon$ 7,100), $\nu_{max}$. ($CHBr_3$) 3420 (NH), 1780 (β-lactam), 1715 ($CO_2R$ and COMe), and 1680 and 1510 cm.$^{-1}$ (CONH) $\nu_{max}$. 3310 (NH), 1755 (β-lactam), 1715 and 1705 ($CO_2R$ and COMe), 1670 and 1525 cm.$^{-1}$ (amide), τ ($CDCl_3$) 2.6 to 3.1 (m, 2-thienyl), 3.14 (1-proton s, $CHPh_2$), 3.6 (1-proton d, J 9 Hz., CONH), 4.25 ($C_{(7)}$—H, dd, J 5 and 9 Hz.), 5.1 ($C_{(6)}$—H, d, J 5 Hz.) 6.18 (2-proton s, $CH_2CO$), 6.56, 6.82 ($C_{(2)}$—$CH_2$, AB-q, J 18 Hz.), 7.2 to 7.7 (4-proton m, possibly $A_2B_2$— pattern; 3-$CH_2.CH_2$=CH), 7.98 (3-proton s, COMe), deuteration changed only the signals for the amide NH and 7–H, washing out the former and reducing the latter to a d (Found: C, 64.1; H, 5.1; N, 4.6; S, 11.8;

$C_3H_{28}N_2O_5S_2$ requires C, 64.3; H, 5.05; N, 5.0; S, 11.4%), $R_f$ 0.35 (system E).

(c) Diphenylmethyl 7β-amino-3-(3-oxobutyl)-ceph-3-em-4-carboxylate, p-toluene sulphonic acid salt A solution of the ester (from Example 1b; 1.33 g.) in dry methylene chloride (25 ml.) was treated with pyridine (2.4 ml., 2.35 g., 29.8 mmole) and cooled to −20°. Phosphorus pentachloride (1.46 g., 7.0 mmole, 2.9 equiv.) was added in six batches during 13 minutes, with the temperature below −20°. The pale orange suspension was warmed quickly to 0°, stirred for 15 minutes, cooled to −35°, and treated with cold methanol (25 ml.) at below −30°. The solution was warmed to 0° during 15 minutes (ice-bath), then to 20° and stirred for 3 hours 20 minutes. Then it was cooled to 0° and stirred with 2N-hydrochloric acid for 1 hour, while warming to 25°. The organic layer was washed with hydrochloric acid, water, sodium bicarbonate, water, and brine and was dried and evaporated. The gum was dissolved in ethyl acetate (5 ml.) and added to a solution of p-toluenesulphonic acid (420 mg.) in ethyl acetate (5 ml.). The solution was refrigerated, and ether (10 ml.) was added with stirring. After stirring had continued for 2 hours a white crystalline solid (513 mg., 35%) was obtained, m.p. 131 to 139 (decomp.), $\lambda_{max}$ 260 nm. ($\epsilon$ 6,450), $\nu_{max.}$ (CHBr$_3$) 1788 ($\beta$-lactam), 1715 (CO$_2$R), 1230 cm.$^{-1}$ (CO$_2$R), $\tau$ (CDCl$_3$ 100 MHz.), 2.26 and 3.0 (4 protons, 2 d, J 7 Hz.; Me.C$_6$H$_4$—), 2.75 (10-proton s, Ph$_2$), 3.19 (1-proton s, CH.Ph$_2$), 5.17 (2-proton s, C$_{(7)}$H and C$_{(6)}$H), 6.61 and 7.35 (C$_{(2)}$—CH$_2$, AB-q, J 17 Hz.), 7.2 to 7.8 (m, —CH$_2$—CH$_2$—CO), 7.79 (s, approx. 3 proton; COMe), 8.09 (3-proton s, C$_6$H$_4$.Me), R$_f$ 0.3 (system F).

(d) 7$\beta$-(D-2-Aminophenylacetamido) - 3 - (3-oxobutyl) ceph-3-em-4-carboxylic acid, trifluoroacetic acid salt A solution of N-t-butoxycarbonyl-D-phenylglycine (2.735 g., 10.8 mmole, 3.5 equiv.) in dry tetrahydrofuran (20 ml.) at —10° was treated with triethylamine (1.54 ml. 1.11 g., 11 mmole) in dried tetrahydrofuran (10 ml.). iso-Butyl chloroformate (1.45 g., 10.5 mmole) was added and the suspension stirred at 20° for 30 minutes. It was then filtered and added to a solution of the amino ester (prepared as in Example 4b, 1.82 g., 3 mmole) in acetonitrile (12 ml.) and N,N-dimethylacetamide (4 ml.) which was stirred at 20° for 30 minutes. Sodium bicarbonate (excess) was added and the emulsion was stirred for 1 hour. Ethyl acetate was added and washed with sodium bicarbonate, water and brine. The solution was dried, evaporated, and the residue (2.65 g.) chromatographed on Kieselgel (0.02 to 0.5 mm.) to give 1.6 g. of a chromatographically homogeneous foam.

The foam was dissolved in anisole (1.5 ml.) and trifluoroacetic acid (6 ml.) and after 4 minutes at 20° evaporated at 20°/2 mm. Ethyl acetate (2 ml.) was added and the mixture triturated with ether to give the title compound (905 mg., 60% yield from the 7-amino ester) as a pale yellow solid, m.p. 115.5 to 136° (decomp.), [$\alpha$]$_D$ +69° $\lambda_{max.}$ (0.1 M-phosphate, pH 6) 261 nm. ($\epsilon$ 7,800), $\nu_{max.}$ 1780 ($\beta$-lactam), 1720 to 1680 (CO$_2$H, F$_3$C.CO$_2^-$, CONH), 720 cm.$^{-1}$ (Ph), $\tau$ (D$_2$O containing F$_3$CCO$_2$H) 2.5 (5-proton s, Ph), 4.38 (C$_{(7)}$—H, d, J 4 Hz.), 4.79 (1-proton s,

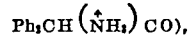

4.97 (C$_{(6)}$—H, d, J 4 Hz.), 6.52 and 6.85 (C$_{(2)}$—CH$_2$, AB-q. J 18 Hz.), 7.2 to 7.5 (4-proton m, 3-

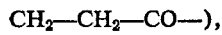

7.84 (3-proton s, COMe), ethyl acetate, (approx. 0.1 mole) was also present. R$_T$ 0.25 (system C), R$_T$ 0.25 (system B), R$_f$ 0.1 (system D). The product moved with a net positive charge at pH 1.9.

EXAMPLE 2

3-(3-Oxobutyl)-7$\beta$-(2-thienylacetamindo)ceph-3-em-4-carboxylic acid

A solution of diphenylmethyl acetoacetate (810 mg., 3.1 mmole) in freshly dried peroxide-free tetrahydrofuran (6 ml.) was added to sodium hydride (142 mg. of a 45% suspension, 2.65 mmole) to give a clear pale-yellow solution, which was added over 5 minutes with stirring to a solution of 3 - chloro-methyl-7$\beta$-(2-thienylacetamido)-ceph-3-em-4-carboxylic acid (383 mg., 1.01 mmole) in tetrahydrofuran (4 ml.). After about half the reagent was added the reaction mixture formed a gel. A further 2 ml. of tetrahydrofuran was added and the addition was completed with vigorous stirring. The colour changed from yellow to orange. After 30 minutes at 25° the red solution was poured into excess hydrochloric acid. [T.L.C. (System D; new spot, R$_F$ 0.55] had shown almost complete reaction after 5 minutes.] The tetrahydrofuran was evaporated and the reaction product partitioned between water and ethyl acetate at pH 8. The organic layer was washed, dried, and concentrated, and added dropwise to light petroleum (b.p. 60 to 80°), to give a pale-yellow powder (A) (254 mg.); the petrol contained mainly unchanged diphenylmethyl acetoacetate (NMR, IR). The aqueous phase was acidified and extracted into ethyl acetate, which was dried and evaporated giving a red oil (100 mg.) with no strong maximum at about 1780 cm.$^{-1}$ (CHBr$_3$) and no protons with $\tau$ values between 3.8 and 5.4 (usual for those in the $\beta$-lactam ring) in its NMR spectrum. The powder (A) (188 mg.) was dissolved in anisole (0.2 ml.) and trifluoroacetic acid (0.8 ml.) and after 4 minutes, rotary-evaporated at 40°/2 mm. The oil was partitioned between water at pH 8 and ethyl acetate. The aqueous layer was acidified to pH 2.0 and extracted into ethyl acetate, which was washed, dried, and evaporated to a tan foam, R$_F$ 0.9 (m, streaked), 0.29 (s), 0.1 (f) (System C), which was purified by preparative paper-chromatography (System C) to give the *title compound* (20 mg.), $\tau$(D$_2$O, with NaHCO$_3$) 2.6–3.1 (3-proton m, 2-thienyl), 4.5 (1-proton d, J=5 Hz.; 7—H), 5.0 (1-proton d, J=5 Hz.; 6—H), 6.15 (2-proton s, CH$_2$CO), 6.5 and 6.90 (2 protons, 2 d, J=18 Hz.; 2—CH$_2$), about 7.2–7.6 (4-proton m, possibly A$_2$B$_2$— pattern; 3—CH$_2$CH$_2$CO), 7.81 (3-proton s, COMe), R$_F$ 0.29 (System C).

EXAMPLE 3

(a) 3-(2$\xi$-Diphenylmethoxycarbonyl-3-oxobutyl)7$\beta$-(2-thienyl-acetamido)ceph-3-em-4-carboxylic acid A solution of diphenylmethyl acetoacetate (12.149 g., 45.5 mmole 2.9 equiv.) in freshly dried peroxide-free tetrahydrofuran (50 ml.) was added dropwise with stirring at 25 to 30° to a suspension of sodium hydride (2.162 g. of 45% dispersion, 40.6 mmoles, 2.6 equiv.) in tetrahydrofuran (10 ml.) during 20 minutes. The yellow solution was added to a stirred solution of 3-chloromethyl-7$\beta$-(2-thienylacetamido)ceph - 3 - em-4-carboxylic acid (5.849 g., 15.7 mmole) in tetrahydrofuran (150 ml.) at 25°. The addition took 25 minutes and the pale-yellow solution was stirred for a further 25 minutes before being poured into 2N-hydrochloric acid (45 ml.).

The solution was evaporated and extracted with ethyl acetate at pH 7.8. The organic phase was washed, dried, partially evaporated and added to a large volume of petroleum spirit to give the *title compound* as white curds (5.947 g. 63%), m.p. 95 to 106° (decomp.), [$\alpha$]$_D$ +8° (CHCl$_3$), $\lambda\lambda_{inflection}$ 235 nm. ($\epsilon$ 13,500) and 260 nm. ($\epsilon$ 8,100), $\nu_{max.}$ (CHBr$_3$) 3600 to 3400 (H$_2$O), 3300 (NH), 1760 ($\beta$-lactam) 1700 to 1670 (CONH, CO$_2$H, COR), and 760 cm.$^{-1}$ (Ph), $\tau$ (60 MHz.; C$_5$D$_5$N) 6.2 (2-proton s; CH$_2$CO), 7.85 (3-proton s) (all other signals were too weak to assign), (60 MHz.; D$_3$CSOCD$_3$) 2.61 (10-proton s; Ph$_2$), 2.6 to 3.05 (3-proton m; 2-thienyl), 3.15 (1-proton s, CH Ph$_2$), 4.40 (1-proton unresolved m; C$_7$—H), 5.12 (1-proton unresolved m; C$_6$—H), 6.2 (2-proton s; CH$_2$CO), 6.2 to 6.8 (C$_2$—CH$_2$, C$_3$—CH$_2$ and H$_2$O in D$_3$CSOCD$_3$), 7.79 (3-proton s; COMe). (Found: C, 60.65; H, 4.6; N, 4.4; S, 9.6. C$_{31}$H$_{28}$N$_2$O$_7$S$_2$ (604.68) 0.5 H$_2$O requires C, 60.6; H, 4.8; N, 4.6; S, 10.4%), R$_f$ 0.35 (vf), 0.55 (s), 0.75 (f) (system B, 0.2 mg., loading), 0.9 (system C, 0.2 mg. loading), 0.4 (s), 0.65 (f), 0.75 (mf) (system D, 0.1 mg. loading), 0.0 (Merck plates, developed by ethyl acetate.)

(b) Diphenylmethyl 3-(3-Oxobutyl)-7$\beta$-(2-thienylacetamido)ceph-3-em-4-carboxylic acid A suspension of 3-(2$\xi$-diphenylmethoxycarbonyl-3-oxo butyl) - 7$\beta$ - (2-thienylacetamido)ceph-3-em-4-carboxylic acid (5.47 g., 9 mmole) in anisole (6 ml.) was shaken with trifluoroacetic acid (24 ml.) at 22° until solution was attained (7 minutes). The pale-brown product was rotary-evaporated at 22°/2 mm. for 15 minutes, dissolved in sodium bicarbonate (pH 8), and washed with ethyl acetate. The aqueous layer was acidified (pH 2) and extracted into ethyl acetate, which was washed, dried, and evaporated to give a foam (3.7 g., 100%). The crude foam was dissolved in tetrahydrofuran (45 ml.) and reacted at 20 to 23° with a solution of diphenyldiazomethane (3 g.) in petroleum spirit (30 ml.). The purple solution was rotary-evaporated, dissolved in ethyl acetate, and added to a large volume of petroleum spirit to give a pale-yellow powder of the crude ester (3.8 g., 72%), R$_f$ 0.6 (mf), 0.35 (f), 0.3 (s), and 0.0 (m) (system E). This solid was chromatographed on Kieselgel (180 g.). Benzene:ethyl acetate (4:1) eluted the *title compound* (1.85 g. 36% from the acid), which was crystallised from ethyl acetate as prisms, m.p. 157 to 159° (decomp.), $[\alpha]_D$ +4.3° (tetrahydrofuran), $\lambda_{max}$ 235 nm. ($\epsilon$ 13,500), inflection at 260 nm. ($\epsilon$ 7,300), $\nu_{max}$ (CHBr$_3$) 3420 (NH), 1780 ($\beta$-lactam, 1715 (CO$_2$R and COMe, and 1680 and 1510 cm.$^{-1}$. (CONH), $\nu_{max}$ 3310 (NH), 1755 ($\beta$-lactam), 1715 and 1705 (CO$_2$R and COMe), and 1670 and 1525 cm.$^{-1}$. (CONH), $\tau$ (100 MHz.; CDCl$_3$, CDCl$_3$ with D$_2$O) 2.6 (10-proton s; Ph$_2$), 2.7 to 3.1 (m; 2-thienyl), 3.14 (1-proton s; C$\underline{H}$Ph$_2$), 3.6 (1-proton d, J 9 Hz.; CONH), 4.25 (1-proton q, J 5 Hz. and 9 Hz.; C$_7$—H), 5.1 (1-proton d, J 5 Hz.; C$_6$—H), 6.18 (2-proton s; CH$_2$—CO), 6.56 and 6.82 (2-proton AB-q, J 18 Hz.; C$_2$—CH$_2$), 7.2 to 7.7 (4-proton m, possibly A$_2$B$_2$-system; C$_3$—CH$_2$CH$_2$CO), and 7.98 (3-proton s; COMe); deuteration removed the doublet at 3.6$\tau$ and changed the quartet at 4.25$\tau$ to a doublet, J 5 Hz. (Found: C, 64.1; H, 5.1; N, 4.6; S, 11.8. C$_{30}$H$_{28}$N$_2$O$_5$S$_2$ (560.67) requires C, 64.3; H, 5.05; N, 5.0; S, 11.4%), R$_f$ 0.3 (s) (system E, 0.1 mg. loading.)

(c) 3-(3-Oxobutyl)-7$\beta$-(2-thienylacetamido)ceph-3-em-4-carboxylic acid

Diphenylmethyl 3-(3-Oxobutyl) - 7$\beta$ - (2-thienylacetamido)ceph-3-em-4-carboxylate (1.407 g.) was dissolved in anisole (2 ml.) and trifluoroacetic acid (8 ml.). After 4 minutes the solution was evaporated at 2 mm. Ethyl acetate was added and evaporated, and the gum was partitioned between ethyl acetate and water at pH 8.0. The aqueous layer was acidified (pH 2) and extracted with ethyl acetate which was washed, dried, and evaporated to give a foam (887 mg., 90%). The foam was crystallised from ethyl acetate (2 ml.) as prisms (400 mg., 41%) of the *title compound*. The filtrate was added to petroleum spirit to give a second crop (450 mg., 46%). The crystals had m.p. 113 to 117° (decomp.). $[\alpha]_D$ +45° (CHCl$_3$), $\nu_{max}$ (pH 6.01 M-phosphate) 236 nm. ($\epsilon$ 12,500), inflection at 260 nm. ($\epsilon$ 7,900), $\nu_{max}$ 3500 (H$_2$O), 3295 (NH), 1768 ($\beta$-lactam), 1720 and 2600 (CO$_2$H), 1696 (possibly COMe), and 1667 and 1522 cm.$^{-1}$ (CONH), $\tau$ (100 MHz.; D$_2$O with NaHCO$_3$) 2.69 and 3.01 (3-proton m; 2-thienyl), 4.50 (1-proton d, J 5 Hz.; C$_7$—H), 5.00 (1-proton d, J 5 Hz.; C$_6$—H), 6.15 (2-proton s; CH$_2$CO) 6.51 and 6.90 (2-proton AB-q, J 19 Hz.; C$_2$—CH$_2$), 7.2 to 7.7

(4-proton m; C$_3$—CH$_2$CH$_2$—CO)

and 7.81 (3-proton s; COMe); there were also signals at 5.86, 7.74 and 8.75 corresponding to 0.2 mole of ethyl acetate. (Found: C, 50.5; H, 4.8; N, 6.1; S, 15.3. C$_{17}$H$_{18}$N$_2$O$_5$S. 0.5 H$_2$O 0.2 EtOAc requires C, 50.6; H, 4.7; N, 6.6; S, 15.3%), R$_f$ 0.6 (system C, 0.2 mg. loading), 0.18 (system B, 0.2 mg. loading), 0.25 (vf), 0.3 (vs) (system D, 0.1 mg. loading).

PHARMACEUTICAL EXAMPLES

A. Intramuscular Injection Composition of single injection

7$\beta$-(D-2-Amino-2-phenylacetamido)-3-(3 - oxobutyl) ceph-3-em-4-carboxylic acid _____mg__ 250
Sodium chloride _____w./v__ 0.8
Water for injection to produce 2 ml.

The solids were dissolved in water and the resulting solution sterilized by filtration through a No. 5/3 sintered glass filter. The sterilized solution was distributed in 2.2 ml. portions in 2 ml. ampoules and the ampoules sealed hermetically. The ampoules were then subjected to sterility tests in the usual manner.

B. Tablet

|   | Mg. |
|---|---|
| (a) 7$\beta$-(D-2-amino - 2 - phenylacetamido)-3-(3-oxobutyl)ceph-3-em-4-carboxylic acid | 250 |
| (b) Mannitol | 75 |
| (c) Potato Starch | 46 |
| (d) Maize Starch | 25 |
| (e) Magnesium stearate | 4 |

The dry ingredients (a), (b) and (c) were blended together and granulated with a 10% aqueous paste of (d). The granules were passed through a No. 12 mesh (B.S.) screen dried to constant weight and sieved through a No. 16 mesh (B.S.) screen. The granules were then lubricated by blending in (e) and compressed at 400 mg. per tablet on suitable punches. The tablets may be coated if required, for instance with a readily soluble conventional film coating.

C. Capsule

|   | Mg. |
|---|---|
| 7$\beta$ - (D-2-amino-2-phenylacetamido)-3-(3-oxobutyl)ceph-3-em-4-carboxylic acid | 250 |
| Aerosil compositum [1] | 3 |

[1] A silicon dioxide/starch blend available from Bush, Beach and Gent of Marlon House, Lloyd's Avenue, London, E.C.3.

The dry powders were blended together homogenously and distributed into well fitted, hard gelatine capsules, so that each contained 250 mg. of the active ingredient.

We claim:
1. A compound of the formula

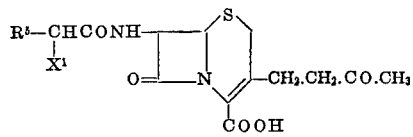

wherein R$^5$ is phenyl; phenyl substituted with halo, hydroxy, lower alkyl, nitro, amino, lower alkanoyl, lower alkoxy or lower alkylmercapto; thien-2-yl; thien-3-yl; or a naphthyl group and X$^1$ is amino, hydroxy, formyloxy, lower alkanoyloxy or hydrogen or a physiologically acceptable base salt or acid addition salt thereof.

2. A compound as claimed in claim 1 wherein R$^5$ is thien-2-yl or thien-3-yl.

3. The compound of claim 1 which is 7$\beta$-(D-2-amino-2-phenylacetamido)-3-(3 - oxobutyl)ceph-3-em-4-carboxylic acid

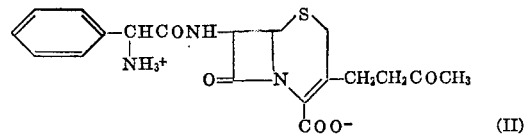

4. The compound of claim 1 which is 7$\beta$-(D-2-amino-2-phenylacetamido)-3-(3 - oxobutyl)ceph-3-em-4-carboxylic acid trifluoroacetate.

5. The compound of claim 1 which is 3-(3-ozobutyl)-7$\beta$-(2-thienylacetamido)ceph-3-em-4-carboxylic acid.

References Cited
UNITED STATES PATENTS

| 3,464,985 | 9/1969 | Holdrege | 260—243 C |
| 3,497,505 | 2/1970 | Pfeiffer et al. | 260—243 C |
| 3,634,417 | 1/1972 | Attenburron | 260—243 C |

NICHOLAS S. RIZZO, Primary Examiner

U.S. Cl. X.R.
424—246